US008433824B2

United States Patent
Barrett et al.

(10) Patent No.: US 8,433,824 B2
(45) Date of Patent: Apr. 30, 2013

(54) THREAD TIMEOUT COORDINATION METHOD AND SYSTEM

(75) Inventors: Claudia S. Barrett, Wake Forest, NC (US); Jason J. Durheim, Rochester, MN (US); Timothy D. Vanderham, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 12/054,779

(22) Filed: Mar. 25, 2008

(65) Prior Publication Data

US 2009/0248782 A1 Oct. 1, 2009

(51) Int. Cl.
*G06F 15/16* (2006.01)
(52) U.S. Cl.
USPC ............ 709/248; 709/245; 709/246; 709/249
(58) Field of Classification Search .................. 709/201, 709/248
See application file for complete search history.

(56) References Cited

U.S. PATENT DOCUMENTS

| 7,472,237 B1* | 12/2008 | Herbst et al. .................. 711/152 |
| 7,774,826 B1* | 8/2010 | Romanek et al. .................. 726/3 |
| 2001/0052022 A1* | 12/2001 | Schaefer et al. ............. 709/236 |
| 2006/0036769 A1* | 2/2006 | Frey et al. ..................... 709/248 |
| 2007/0232031 A1* | 10/2007 | Singh et al. ................... 438/479 |
| 2008/0189350 A1* | 8/2008 | Vasa et al. ..................... 709/201 |
| 2008/0205288 A1* | 8/2008 | Herzog ......................... 370/252 |

* cited by examiner

*Primary Examiner* — Brian P Whipple
*Assistant Examiner* — Keyvan Emdadi
(74) *Attorney, Agent, or Firm* — Toler Law Group

(57) ABSTRACT

An apparatus, program product and method associates a timeout used by a client computer sending a work request with a maximum amount of time that the server computer should spend processing the work request. The server computer dynamically reacts to diverse, incoming client load requirements without using a static processing timeout on the server computer side. Resources may be made available for other work.

20 Claims, 2 Drawing Sheets

THREAD TIMEOUT COORDINATION METHOD AND SYSTEM

FIELD OF THE INVENTION

The present invention relates generally to server-client communications, and more particularly, to request coordination and timeout implementations.

BACKGROUND OF THE INVENTION

Computer technology continues to be improved for handling more useful and complex functions associated with specific applications. Despite the continual advances in the speed and power of computers, however, these applications of computer technology continue to demand even greater computing power. For this reason, an ever-present need exists for improving the performance of the computer software that controls how a computer operates.

Generally, the software that controls how the computer operates, in its most basic form, is referred to as the operating system of the computer. The operating system is essentially a set of software programs that manages the various hardware and software resources of the computer and handles the computer's interaction with users. For example, it is the operating system that creates the computer's prompts and screens on the monitor to interface with a user and that runs the computer's programs for the user. Furthermore, the operating system will allow a computer to interface with its hardware resources, such as a printer or a disk drive, or will allow a user to run other higher level software applications on the computer. The operating system, therefore, must be able to complete a large number of different functions to ensure that the computer, including its accessible hardware and software resources, functions properly and at a sufficient speed for the user.

Within the operating system of a computer, the various internal functions that are handled are referred to as tasks. These various tasks may be thought of, in the traditional sense, as jobs that the computer must do when it is properly running programs for a user. A process that accomplished a related series of such tasks is sometimes referred to as a thread. For example, a task might involve updating the contents of a file or writing a file to a storage device, such as a disk drive.

In the context of client-server applications, threads are used to facilitate communication between program parts executing on both the client and server computers. A thread executing on a client routinely prepares and sends data requests to a corresponding thread on the server. The server thread executes applicable code to accomplish the request and return it to the client thread. Ideally, the server thread will complete its task before the client thread (awaiting the task results) is timed-out. A timeout is an interrupt signal generated by a program or device that has waited a certain length of time for some input, but has not received it. An interrupt may include a synchronous event in software indicating a need for change in execution. Many programs perform timeouts so that the program does not sit idle waiting for input that may never come. Timeouts also may prevent looping (where the client computer ceaselessly waits for an input), which may cause an entire system to become unresponsive.

In a typical client-server environment, there are usually various timeouts associated with both sides. Timeouts can vary greatly depending on the product and/or protocol involved. However, the length of time before a timeout occurs usually relates to how long a thread is willing to wait for a response from whatever resource a request was sent to. This optimization is good for the client side, but even if a client times out, the server side will generally continue to process the request until completion, and/or server thread hits it's own, separate timeout. This means that resources that could otherwise be freed up are still processing a request that, generally speaking, the original caller no longer cares about.

An example involving Java Servlets illustrates the concept of timing-out. Java Servlets are used in conjunction with web browsers. The web browser acts as the client. The servlet resides on the server side. When an event occurs on a web page, such as clicking on a submit button, user-entered data on the page, such as information to make an online purchase of goods, may be sent to the servlet for processing. The servlet then receives that data and takes appropriate actions, such as verifying the credit card number and checking inventory to make sure the purchase can be fulfilled.

If the server takes a lengthy period of time to process that data, the web browser may timeout and show an error message to the effect that the page being requested cannot be obtained, or that communication was lost with the web server. The server will eventually finish processing the user's data, but because of the timeout, the web page that the server returns to the client browser (after the data has been processed) will go undisplayed.

Even if the data is able to be processed within the timeout period enforced by the browser, the processing may still be lengthy and leave the user wondering if the process has been timed-out and lost. Without a monitoring system that uses words and/or a pictorial to indicate the progress of the data processing to the user, the user would only see an hourglass while the mouse is hovering over the browser. This has been a source of frustration for users encountering this event.

What is consequently needed is an improved manner of handling timeouts in a client-server environment.

SUMMARY OF THE INVENTION

The present invention provides an improved computer implemented method, apparatus and program product for managing work within a networked computer system, comprising sending a work request from a requesting computer to a receiving computer, and sending a request timeout associated with the work request from the requesting computer to the receiving computer. The request timeout may indicate when processing of the work request by the receiving computer should be timed-out.

In accordance with embodiments consistent with the underlying principles of the present invention, processing of the work request may be timed-out at a point indicated by the request timeout. Embodiments may further move on to new work at a point subsequent to the timing-out of the processing.

Aspects of the invention may include configuring the request timeout to indicate a timeout point for the receiving computer that coincides with a timeout point for the sending computer. A duration may be set for the request timeout. Other aspects may include generating the work request and the request timeout.

Exemplary processes in accordance with embodiment of the invention may receive the request timeout. Other aspects may include initiating processing of the work request upon receiving the work request. Where so configured, the request timeout may be sent in a common transmission with the work request. Alternatively the request timeout may be sent separately from the work request.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Figure 1:
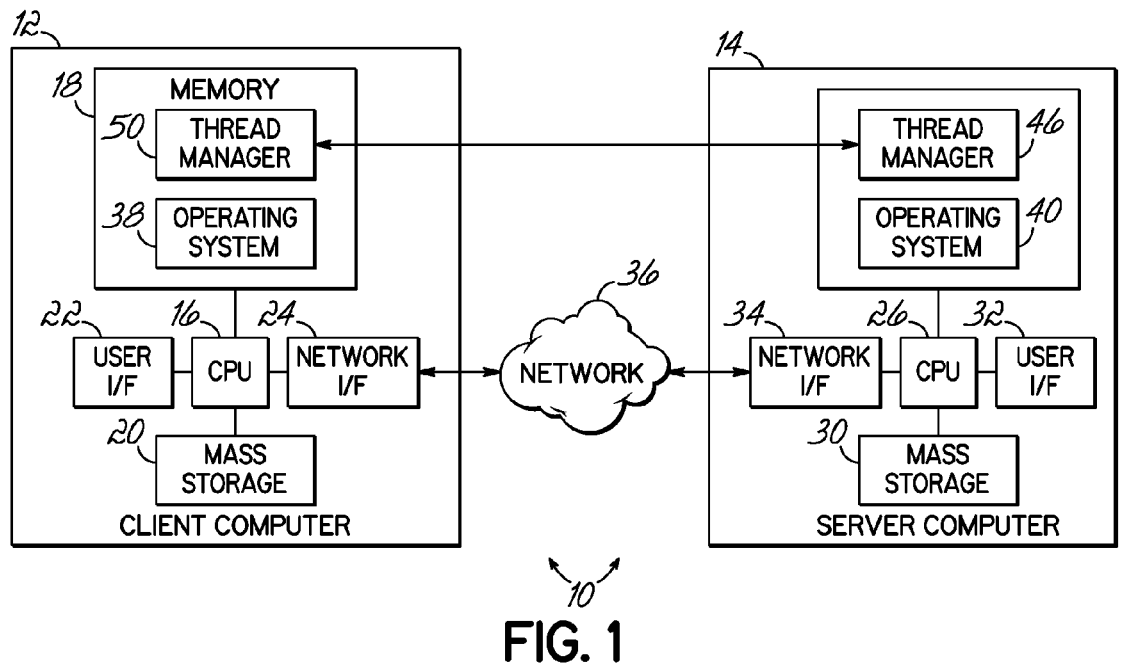
FIG. 1 is a block diagram of a client-server computer system in accordance with the underlying principles of the present invention.

Embodiments consistent with the underlying principles of present invention may connect or otherwise associate a timeout used by a client computer sending a work request with a maximum amount of time the server computer should spend processing the work request. This feature may allow the server computer to dynamically react to diverse, incoming client load requirements without using a static processing timeout on the server computer side. Aspects of the invention may also free up resources sooner for other work that would otherwise stay tied up without benefit. Although aspects of the invention may have particular application to affect error paths between the client and server computers, optimizations such as those discussed herein during error paths may help minimize a growing problem by allowing valuable resources to be free up to process real work.

While there are a number of different ways of implementing embodiments in a manner consistent with the underlying principles of the present invention, aspects typically feature the client computer's ability to transmit a timeout for a request along with a packet load. The packet load and timeout may be read on the server computer side.

In one embodiment, a piece of code may be placed on the server at a point where incoming requests are streamed in, and where those request are passed off to a thread to be processed. This code may essentially comprise a thread manager. The thread manager may hold a map of the thread ID of the thread processing the request. The thread manager may also know the time at which the thread could be ended based on the timeout read in from and associated with the client computer for that request. If the request goes back out within the time limit, it may be removed from the map. Otherwise, if the time limit is reached, then action may be taken to end the processing of that request on the thread. Depending on the server computer side implementation, embodiments may include interrupting or killing a thread, and potentially rolling back any transactions involved in order to free up that thread and the resources it consumed.

When dealing with Remote Method Invocation (RMI) traffic, embodiments may be implemented with a server computer side Object Request Broker (ORB) interceptor. RMI allows a Java program to invoke a method that is being executed on a remote machine. ORB acts as the middleware between clients and servers. ORBs may receive the request, forward them to the appropriate servers, and then hand the results back to the client. ORB Interceptors are intended to be a way by which ORB services gain access to ORB processing, effectively becoming part of the ORB.

The ORB interceptor may be called in both the receiving and sending request paths to monitor the various worker threads and timeout values. This embodiment may include a relatively simple path to create, as the ORB request timeout on the client's side governs when the client timeouts. A common code base on both the client and server computers may make integration of the function relatively easy.

Turning now to the Drawings, wherein like numbers may denote like parts throughout the several views, FIG. 1 illustrates a client-server based computer system or environment 10 consistent with the invention. System 10 includes at least one apparatus, e.g., one or more client computers 12 and one or more server computers 14. For the purposes of the invention, each computer 12, 14 may represent practically any type of computer, computer system or other programmable electronic device capable of functioning as a client and/or server in a client-server environment. Furthermore, each computer 12, 14 may be implemented using one or more networked computers, e.g., in a cluster or other distributed computing system. As is common in many client-server systems, multiple client computers 12 will typically be interfaced with a given server computer 14.

Client computer 12 typically includes a central processing unit 16 including at least one microprocessor coupled to a memory 18, which may represent the random access memory (RAM) devices comprising the main storage of client computer 12, as well as any supplemental levels of memory, e.g., cache memories, non-volatile or backup memories (e.g., programmable or flash memories), read-only memories, etc. In addition, memory 18 may be considered to include memory storage physically located elsewhere in client computer 12, e.g., any cache memory in a processor in CPU 16, as well as any storage capacity used as a virtual memory, e.g., as stored on a mass storage device 20 or on another computer coupled to client computer 12.

Client computer 12 also typically receives a number of inputs and outputs for communicating information externally. For interface with a user or operator, client computer 12 typically includes a user interface 22 incorporating one or more user input devices (e.g., a keyboard, a mouse, a trackball, a joystick, a touchpad, and/or a microphone, among others) and a display (e.g., a CRT monitor, an LCD display panel, and/or a speaker, among others). Otherwise, user input may be received via another computer or terminal.

For additional storage, client computer 12 may also include one or more mass storage devices 20, e.g., a floppy or other removable disk drive, a hard disk drive, a direct access storage device (DASD), an optical drive (e.g., a CD drive, a DVD drive, etc.), and/or a tape drive, among others. Furthermore, client computer 12 may include an interface 24 with one or more networks (e.g., a LAN, a WAN, a wireless network, and/or the Internet, among others) to permit the communication of information with other computers and electronic devices. It should be appreciated that client computer 12 typically includes suitable analog and/or digital interfaces between CPU 16 and each of components 18, 20, 22 and 24 as is well known in the art.

In a similar manner to client computer 12, server computer 14 includes a CPU 26, memory 28, mass storage 30, user interface 32, and network interface 34. However, given the nature of computers 12 and 14 as client and server, in many instances server computer 14 will be implemented using a multi-user computer such as a server computer, a midrange computer, a mainframe, etc., while client computer 12 will be implemented using a desktop or other single-user computer. As a result, the specifications of the CPU's, memories, mass storage, user interfaces and network interfaces will typically vary between computers 12 and 14. Other hardware environments are contemplated within the context of the invention.

Computers 12, 14 are generally interfaced with one another via a network 36, which may be public and/or private, wired and/or wireless, local and/or wide-area, etc. Moreover, network 36 may represent multiple, interconnected networks. In the illustrated embodiment, for example, network 36 may include the Internet.

Each computer 12, 14 operates under the control of an operating system 38, 40, and executes or otherwise relies upon various computer software applications, components, programs, objects, modules, data structures, etc. For instance, thread managers 46, 50 may manage thread coordination and communication aspects as described herein. Similarly, various other applications, components, programs, objects, modules, etc. may also execute on one or more processors in another computer coupled to computers 12, 14 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as computer-readable program code, or simply program code. Program code typically comprises one or more instructions that are resident at various times in various memory and storage devices in a computer, and that, when read and executed by one or more processors in a computer, cause that computer to perform the steps necessary to execute steps or elements embodying the various aspects of the invention.

While the invention has and hereinafter will be described in the context of fully functioning computers and computer systems, those skilled in the art will appreciate that the various embodiments of the invention are capable of being distributed as a program product in a variety of computer readable forms, and that the invention applies equally regardless of the particular type of tangible signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature.

Given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

Figure 2:
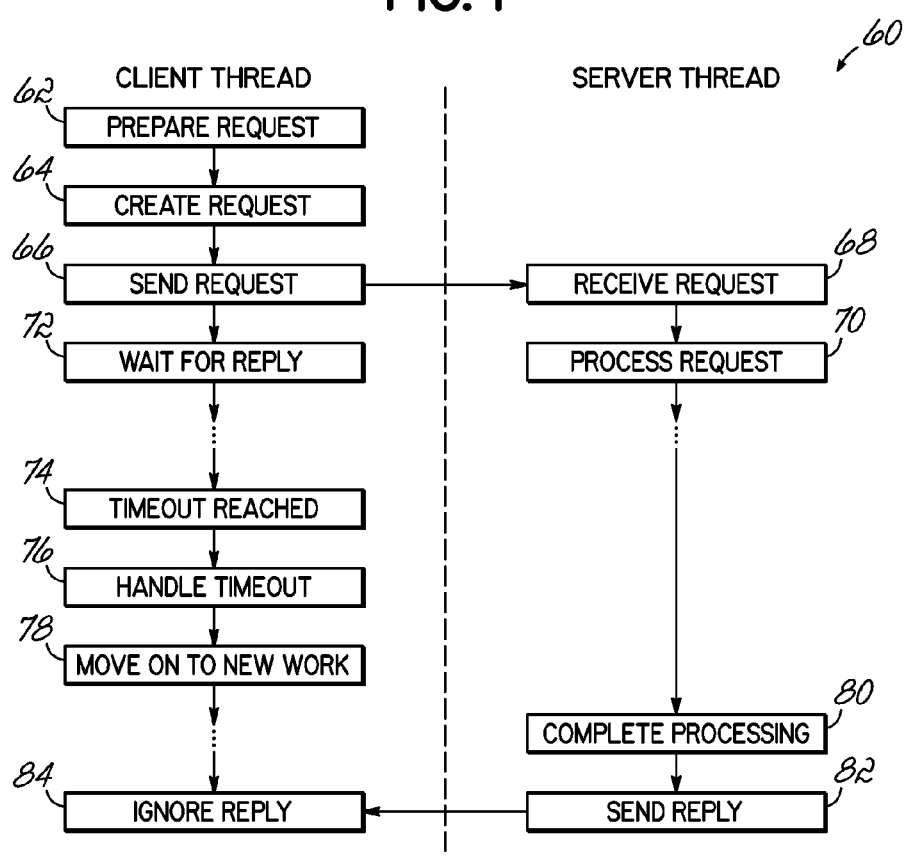
FIG. 2 shows client-server interactions consistent with those of a prior art system.

To better illustrate the processes of the present invention, server-client interaction is shown in the flowchart 60 of FIG. 2. More particularly, the flowchart 60 shows how a lack of timing and other coordination in prior art systems will result in wasted work and other inefficiency.

At block 62 of the flowchart 60, the client computer 12 prepares a request. The client computer 12 creates at block 64 the request, and sends the request at block 66 to the server computer 14. At block 68, the server computer 14 receives the request. The server computer 14 then initiates processing of the thread request at block 70.

The client computer 12 waits for a reply at block 72. The client computer 12 continues to wait for a reply at block 72 until the client-side timeout is reached at block 74. As discussed herein, a timeout may include the facility whereby after a certain period of inactivity a connection is dropped.

The client computer 12 then handles the timeout at block 76. That is, the client computer 12 stops waiting for a reply and moves on at block 78 to new work.

Oblivious to the timeout occurring at block 78, the server computer 14 continues to process the request at block 70 until the process is complete at block 80. As shown in FIG. 1, the process was complete at block 80 at a time after the client computer 12 had already moved on to the new work at block 78. As a consequence, when the server computer 14 sends at block 82 its reply (after completing processing at block 80), the client computer 12 will ignore at block 84 the reply.

As such, valuable processing resources at the server computer 14 may have been wasted while the server computer 14 continued to process the request after the client computer had already moved on to new work at block 78.

Figure 3:
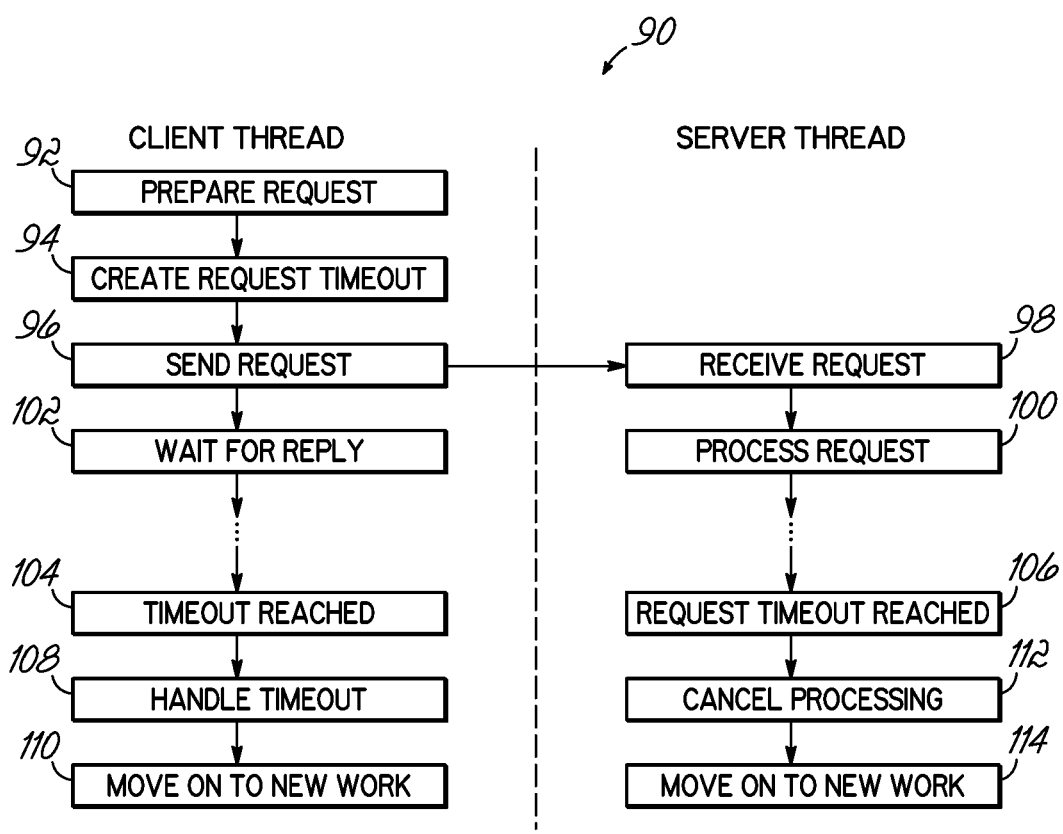
FIG. 3 is shows a series of client interactions and other processes executable by the hardware and software of FIG. 1 for managing work in a client-server environment in accordance with the underlying principles of the present invention.

FIG. 3 shows a series of steps executable by the hardware and software of FIG. 1 for managing work in a client-server environment in accordance with the underlying principles of the present invention. More particularly, the flowchart 90 shows interactions between client 12 and server computers 14 regarding a work request that includes a request timeout that is consistent with the invention.

Turning more specifically to the flowchart 90, the client computer 12 may prepare a request at block 92. In one example, a request may pertain to a room reservation.

The client computer 12 may create at block 94 a request timeout. For example, the client computer 12 may create a request timeout associated with or having a 60 second timeout feature. That is, the request timeout may convey information to the server computer 14 instructing it that it should not continue processing after 60 seconds from receipt of the request, or some other point in time or processing indicated in the request or otherwise known to the server computer 14.

The client computer 12 may send at block 96 the request to the server computer 14. In this embodiment, the request timeout may be sent along at block 196 with the work request. The server computer 14 may receive the request at block 98 and begin processing it at block 100. In the meantime, the client computer 12 may wait at block 102 for a reply.

As the server computer 14 continues to process the request at block 100, the client-side timeout may be reached at block 104 on the client computer 12. Accordingly, the client computer 12 may handle at block 108 the timeout and move on to new work at block 110.

Coincident with the client-side/sender timeout being reached at block 104 at the client computer 12, the server computer 14 may determine that the request timeout has been reached at block 106. As a consequence, the server computer 14 may cancel its own processing at block 112. This cancellation may free up the processing resources on the server computer 14 to move on at block 114 to new work.

While the present invention has been illustrated by a description of various embodiments and while these embodiments have been described in considerable detail, it is not the intention of the Applicants to restrict, or, in any way limit the scope of the appended claims to such detail. The invention is not limited to interactions with a Java object oriented computing environment. The invention in its broader aspects is therefore not limited to the specific details, representative apparatus and method, and illustrative example shown and described. For instance, while client and server computers are used to illustrate examples of the invention, any sending and receiving networked computers may benefit equally from aspects of the invention. Accordingly, departures may be made from such details without departing from the spirit or scope of Applicants' general inventive concept.

What is claimed is:

1. A method of managing work within a networked computer system, comprising:
   maintaining a thread map comprising a thread identifier of a thread to process a work request and a first timeout point associated with when processing of the work request is timed out; wherein the thread map is updated to remove the thread identifier from the thread map in response to one of the work request being timed out and in response to the work request being complete;
   generating a server-side timeout request and a client-side timeout request at a client computer, wherein the work request comprises Remote Method Invocation (RMI) traffic, wherein the server-side timeout request is received at an object request broker interceptor and includes the first timeout point, wherein the client-side timeout request includes a second timeout point indicating when the client computer ceases to wait for a response to the work request from the server computer, and wherein the first timeout point and the second timeout point coincide;
   using the object request broker interceptor to monitor communications to and from the client computer relating to the thread, to halt the thread, and to remove the thread identifier from the thread map in response to the one of the work request being timed out and the work request being complete; and
   sending the work request from the client computer to the server computer, wherein the work request includes the server-side timeout request.

2. The method of claim 1 further comprising timing-out the processing of the work request at the first timeout point indicated by the request timeout.

3. The method of claim 2 further comprising initiating execution of new work at the server computer subsequent to the first timeout point.

4. The method of claim 1 further comprising setting a duration of the server-side timeout request.

5. The method of claim 1 further comprising generating the work request.

6. The method of claim 1 further comprising receiving the server-side timeout request.

7. The method of claim 1 further comprising initiating processing of the work request upon receiving the work request.

8. An apparatus, comprising:
   a memory including:
      program code comprising an object request broker interceptor; and
      a thread map comprising a thread identifier of a thread to process a work request and a first timeout point associated with when processing of the work request is timed out, wherein the thread map is updated to remove the thread identifier from the thread map in response to one of the work request being timed out and in response to the work request being complete; and
   a processor configured to access the memory and to execute the program code to cause the object request broker interceptor to receive the work request that includes the server-side timeout request from a client computer, wherein the server-side timeout request includes the first timeout point and wherein the work request comprises Remote Method Invocation (RMI) traffic, to monitor communications to and from the client computer relating to the thread, to halt the thread, and to remove the thread identifier from the thread map in response to the one of the work request being timed out and the work request being complete, wherein the client computer is configured to cease to wait for a response to the work request at a second timeout point, wherein the first timeout point and the second timeout point coincide, and wherein a first duration of the server-side timeout request and a second duration of a client-side timeout request are set at the client computer.

9. The apparatus of claim 8, wherein the processor is further configured to timeout processing of the work request at the first timeout point.

10. The apparatus of claim 8, wherein the processor is further configured to initiate execution of new work at a point subsequent to the first timeout point.

11. The apparatus of claim 8, wherein the processor is further configured to initiate processing of the work request upon receiving the work request.

12. A program product, comprising:
   program code comprising an object request broker interceptor configured to receive a work request that includes a server-side timeout request from a client computer, wherein the program code is stored in a memory also comprising a thread map that includes a thread identifier of a thread to process a work request and a first timeout point associated with when processing of the work request is timed out wherein the thread map is updated to remove the thread identifier from the thread map in response to one of the work request being timed out and in response to the work request being complete, wherein the server-side timeout request includes the first timeout point and wherein the work request comprises Remote Method Invocation (RMI) traffic, wherein the program code is further configured to monitor communications to and from the client computer relating to the thread, to halt the thread, and to remove the thread identifier from the thread map in response to the one of the work request being timed out and the work request being complete, wherein the client computer ceases to wait for a response to the work request at a second timeout point, wherein the first timeout point and the second timeout point coincide, and wherein a first duration of the server-side timeout request and a second duration of a client-side timeout request are set at the client computer; and
   a non-transitory computer readable medium bearing the program code.

13. The apparatus of claim 8, wherein the processor times out processing of the work request at the first timeout point without a subsequent exchange between the client and server computers of information associated with the work request.

14. The apparatus of claim 8, wherein the client computer includes a thread manager configured to monitor communications from the server computer for the response to the work request.

15. The method of claim 1, wherein there is no further information exchanged between the client computer and the server computer regarding the server-side timeout.

16. The method of claim 1, further comprising using a server thread manager to timeout the processing at the first timeout point.

17. The method of claim 1, further comprising initiating an execution of a new thread at the server computer at the first timeout point.

18. The method of claim 1, further comprising receiving the work request at a server thread manager of the server computer.

19. The apparatus of claim 8, wherein the object request broker interceptor is executed at a server computer and is configured to invoke a method associated with the thread at the client computer.

20. The program product of claim 12, wherein the object request broker interceptor is executed at a server computer and is configured to invoke a method associated with the thread at the client computer.

* * * * *